No. 706,549. Patented Aug. 12, 1902.
C. GLOVER.
COASTER BRAKE.
(Application filed June 11, 1901.)
(No Model.)
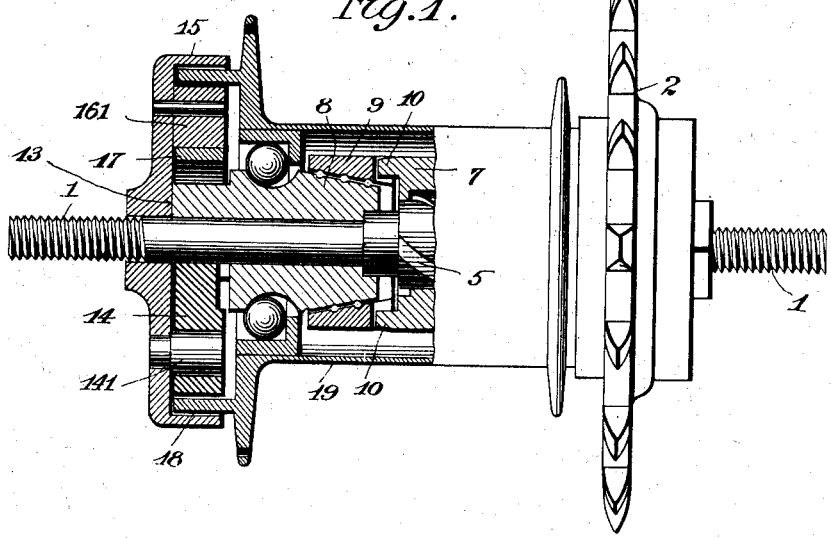
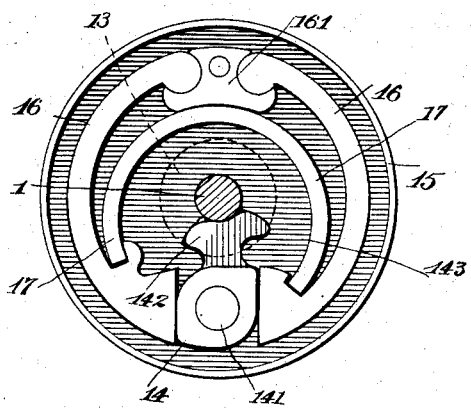
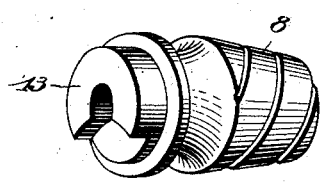
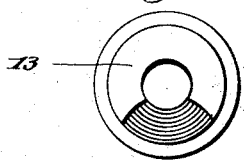
WITNESSES:
INVENTOR:
Charles Glover
BY
ATTORNEY
THE NORRIS PETERS CO., PHOTO-LITHO., WASHINGTON, D. C.

UNITED STATES PATENT OFFICE.

CHARLES GLOVER, OF NEW BRITAIN, CONNECTICUT, ASSIGNOR TO P. & F. CORBIN, A CORPORATION OF CONNECTICUT.

COASTER-BRAKE.

SPECIFICATION forming part of Letters Patent No. 706,549, dated August 12, 1902.

Application filed June 11, 1901. Serial No. 64,098. (No model.)

*To all whom it may concern:*

Be it known that I, CHARLES GLOVER, a citizen of the United States, residing at New Britain, Hartford county, Connecticut, have invented certain new and useful Improvements in Coaster-Brakes, of which the following is a full, clear, and exact description.

My invention relates to brake mechanism for coaster-brakes and like devices.

The function of the coaster-brake as used upon the bicycle and other vehicles is to permit the driver to cease pedaling whenever he so desires, allowing the machine to coast along freely under its own momentum. Its construction is such that the user may at any time by reversing the direction of the pedal-cranks, or, as it is called, "back-pedaling," throw in brake mechanism, which will coact with some part of the moving mechanism in such manner as to check the advance of the machine or slow it down to any desired speed.

My invention as claimed herein consists mainly in the improvement of the brake mechanism.

The objects I have sought to attain are simplicity, durability, effectiveness, ease and certainty of action, quickness, smoothness, and evenness of operation under all conditions.

In the accompanying drawings, Figure 1 is partly a projection and partly a vertical section of a coaster-brake such as used upon bicycles and the like. Fig. 2 is a vertical projection of the brake proper, the wheel-hub and shifting mechanism being removed to facilitate the inspection. Fig. 3 is a perspective view of a detail, and Fig. 4 is an end elevation of the detail shown in Fig. 3.

The following detailed description relates to the preferred form of my invention, which, it is obvious, is susceptible of modification without departing from the spirit and scope of my invention.

1 is a main shaft or axle.

2 is a gear or sprocket wheel, which will be termed herein the "driver."

5 is a worm carried by the driver 2 and projecting within the hub 19.

7 is a sleeve mounted upon the worm 5. Said sleeve 7 may be shifted from left to right or from right to left, according to the direction of rotation of the driver 2. Any suitable means—for example, such as shown in my Letters Patent No. 691,541—may be employed between the hub 19 and the sleeve 7, whereby when the driver 2 is advanced it will be coupled with the hub 19, so as to impart a corresponding advance movement thereto. Of this mechanism I make no claim herein.

8 is a cone loosely mounted upon the axle 1. This cone 8 will be termed herein the "brake-actuator."

9 is a clutch-ring adapted to coact with the brake-actuator 8.

10 10 are projections on the sleeve 7, taking in recesses in the clutch-ring 9, so that said parts are incapable of independent rotative movement.

13 is a projection from the end of the brake-actuator 8.

14 is a cam, preferably double-acting, pivoted at 141 upon a bracket 15.

16 16 are brake-shoes.

161 is a hinge-bearing for one end of each of said brake-shoes. The other end of each brake-shoe bears against the cam 14.

17 is a spring, preferably bowed, so that the middle portion of the same will bear against the bearing 161, while the ends will engage the brake-shoes 16 16 in such manner as to hold said brake-shoes in retracted position.

142 is an arm projecting from the cam 14, and 143 is a shoulder preferably formed upon said arm 141, provided to act as a stop to limit the swing of said arm 141 in one direction by impinging against the axle 1 when the brake-shoes are fully retracted. The brake-actuator 8 is adapted to engage with the arm 142 in such a manner—for example, through the projection 13—that when said brake-actuator 8 is turned the cam 14 is tilted, thus forcing the adjacent ends of the brake-shoes 16 16 away from each other, which shoes being hinged at the opposite ends swing apart and bear against the flange 18 of the hub 19 in such manner as to frictionally resist the turning of the same. These brake-shoes may be formed of wrought or cast metal, if desired. The construction is such that in the event of breakage the parts may be readily replaced, and the action is such that it performs its function quickly, evenly, and smoothly.

In operation the forward rotation of the driver 2 imparts a forward movement to the hub 19. The rearward movement of the driver 2 shifts the sleeve 7 to the left, pressing the clutch-ring 9 in engagement with the brake-actuator 8, so that said parts are coupled together, whereupon a continued rearward movement of the driver 2 rotates the brake-actuator 8, which through the projection 13 swings the cam 14, which in turn swings each of the hinged brake-shoes. When the driver is again advanced, the cam 14 returns to the position shown in Fig. 2, the spring 17 drawing said brake-shoes away from the flange 18, freeing the hub 19.

What I claim is—

1. In a brake mechanism for coaster-brakes and the like, a stationary block having two recesses therein, two curved brake-shoes, one end of each of said brake-shoes being adapted to fit within said recesses and means to operate said brake-shoes, substantially as described.

2. A brake mechanism for coaster-brakes and the like, comprising a plurality of hinged brake-shoes, a stationary support therefor, a double-acting cam pivotally mounted between the ends of said brake-shoes, an arm projecting from said cam, a shoulder on said arm, a wheel-hub, an axle, said axle being located in the path of movement of the shoulder on said cam-arm and means for operating said cam, substantially as described.

3. A brake mechanism for coaster-brakes comprising an axle, a wheel-hub, bearings therefor, brake-shoes adapted to coact with said wheel-hub or an extension thereof, said brake-shoes being hinged upon a stationary support, a pivotally-mounted cam located between the ends of said brake-shoes and adapted to operate both of said brake-shoes, an arm projecting from said cam and a shoulder on said arm adapted to impinge against said axle and means to operate said cam, substantially as described.

4. In a brake mechanism for coaster-brakes and the like, a stationary block having two recesses therein, two curved brake-shoes, one end of each of said brake-shoes being adapted to fit within said recesses, and a spring for holding said brake-shoes in their retracted position, and means to operate said brake-shoes, substantially as described.

5. In a brake mechanism for coaster-brakes and the like, a stationary block having two recesses therein, two curved brake-shoes, one end of each of said brake-shoes being adapted to fit within said recesses, and a spring for holding said brake-shoes in their retracted position, said spring engaging said brake-shoes near the ends thereof and means to operate said brake-shoes, substantially as described.

6. In a brake mechanism for coaster-brakes and the like, a stationary block having two recesses therein, two curved brake-shoes, one end of each of said brake-shoes being adapted to fit within said recesses, and a spring for holding said brake-shoes in their retracted position, said spring engaging said brake-shoes near the ends thereof and bearing against the said stationary block and means to operate the brake-shoes.

7. In a brake mechanism for coaster-brakes and the like, a stationary block having two recesses therein, two curved brake-shoes, one end of each of said brake-shoes being adapted to fit within said recesses, and a spring for holding said brake-shoes in their retracted position, said spring engaging said brake-shoes near the ends thereof and means for operating said brake-shoes consisting of a pivoted cam and actuating-arm.

Signed at New Britain, Connecticut, this 5th day of June, 1901.

CHARLES GLOVER.

Witnesses:
A. H. GARNERDINGER,
W. G. BANCROFT.